US007818576B2

(12) United States Patent
Halcrow et al.

(10) Patent No.: US 7,818,576 B2
(45) Date of Patent: *Oct. 19, 2010

(54) USER CONTROLLED ANONYMITY WHEN EVALUATING INTO A ROLE

(75) Inventors: Michael Austin Halcrow, Pflugerville, TX (US); Dustin C Kirkland, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/235,738

(22) Filed: Sep. 23, 2008

(65) Prior Publication Data

US 2009/0024850 A1 Jan. 22, 2009

Related U.S. Application Data

(63) Continuation of application No. 10/870,526, filed on Jun. 17, 2004, now Pat. No. 7,472,277.

(51) Int. Cl.
*H04L 9/00* (2006.01)
(52) U.S. Cl. .................. 713/175; 713/155; 713/156; 713/176; 726/1; 726/2; 726/5; 726/6; 705/50; 705/67; 705/69
(58) Field of Classification Search .......... 713/155, 713/156, 175, 176; 726/1, 2; 705/50, 67, 705/69
See application file for complete search history.

(56) References Cited

U.S. PATENT DOCUMENTS 6,055,637 A 4/2000 Hudson et al.
6,108,644 A 8/2000 Goldschlag et al.

6,209,100 B1 3/2001 Robertson (Continued)

OTHER PUBLICATIONS

Stuart Schechter et al, Anonymous Authentication of Membership in Dynamic Groups, pp. 1-12, Springer-Verlag, 1999.*

(Continued)

*Primary Examiner*—Nasser Moazzami
*Assistant Examiner*—Shanto M Abedin
(74) *Attorney, Agent, or Firm*—Matthew W. Baca; Amy J. Pattillo

(57) ABSTRACT

A method, system, and program for user controlled anonymity when evaluating into a role are provided. An anonymous authentication controller enables a user to control anonymity of the user's identity for role based network accesses to resources, without requiring reliance on any single third party to maintain user anonymity. First, a role authentication certificate is received from a role authenticator, wherein the role authentication certificate certifies that the holder of the role authentication certificate is a member of a particular role without allowing the role authenticator issuing the role authentication certificate the ability to track an identity of a user holding the role authentication certificate. Next, an anonymous channel is established for anonymously presenting the role authentication certificate to a resource protector, wherein the resource protector requires the user to authenticate into the particular role to access a resource, wherein the role authentication certificate authenticates the user into the particular role without enabling the resource protector to ascertain the identity of the user, such that the user is in control of maintaining user anonymity for authenticated role-based accesses.

15 Claims, 6 Drawing Sheets

U.S. PATENT DOCUMENTS

| | | | |
|---|---|---|---|
| 6,985,946 B1 * | 1/2006 | Vasandani et al. | 709/225 |
| 6,985,953 B1 | 1/2006 | Sandhu et al. | |
| 7,028,180 B1 * | 4/2006 | Aull et al. | 713/156 |
| 7,103,768 B2 | 9/2006 | Narita | |
| 7,222,107 B2 * | 5/2007 | Ludwig et al. | 705/67 |
| 7,222,362 B1 * | 5/2007 | Canetti et al. | 726/5 |
| 7,299,352 B2 | 11/2007 | Simon | |
| 7,472,277 B2 * | 12/2008 | Halcrow et al. | 713/175 |
| 2001/0021928 A1 * | 9/2001 | Ludwig et al. | 705/67 |
| 2002/0004900 A1 * | 1/2002 | Patel | 713/155 |
| 2002/0116337 A1 * | 8/2002 | Peled et al. | 705/51 |
| 2002/0144108 A1 | 10/2002 | Benantar | |
| 2003/0163685 A1 * | 8/2003 | Paatero | 713/155 |
| 2004/0254868 A1 | 12/2004 | Kirkland et al. | |
| 2005/0010535 A1 | 1/2005 | Camenisch et al. | |
| 2005/0076089 A1 | 4/2005 | Fonseca | |
| 2005/0149724 A1 | 7/2005 | Graff | |

OTHER PUBLICATIONS

"Onion Routing", [available online], 2 pages. Accessed from <http://www.onion-router.net/> on Mar. 10, 2004.

Ley, Michael, "Crypto 1982: Santa Barbara, California, USA", [available online] copyright Feb. 27, 2004, 1 page. Accessed from <http://www.informatik.uni-trier.de/~ley/db/conf/crypto/crypto82.html> on Mar. 10, 2004.

IBM Research Disclosure, "Information Exchange Service", document 449136, copyright Sep. 2001, pp. 1584-1585, 2 pages.

* cited by examiner

USER CONTROLLED ANONYMITY WHEN EVALUATING INTO A ROLE

BACKGROUND OF THE INVENTION

1. Technical Field

The present invention relates in general to improved authentication and in particular to improved identity protection during anonymous evaluation into a role. Still more particularly, the present invention relates to allowing a user control over anonymity of the user's identity for authenticated role-based accesses, without requiring reliance on any single third party to maintain anonymity.

2. Description of the Related Art

Within a network, it is typical for access to the network, data, and other resources to be restricted by a resource protector that only allows access to a particular user or group of users. One method for defining restrictions is by defining the role or roles that a user must be a member of to receive access beyond the resource protector. Users are individually assigned these roles, but must still prove membership or evaluate to assigned roles to receive access to the network, data, or other resources protected by the role requirement.

In some cases, when a user authenticates into a role, it would be advantageous for the user's identity to remain anonymous. For example, if a user is required to evaluate a manager through an on-line survey, the user would like to remain anonymous when filling out the evaluation. However, to access the on-line survey, the user must show that the user belongs to the manager's employee group, where the manager's employee group is a role.

One solution to maintaining identity anonymity during role authentication is through the use of a trusted third party arbitrator. The user shows the user's identity to the trusted third party arbitrator and relies on the trusted third party arbitrator to vouch for the user's role membership to a resource protector while promising to keep the user's identity secret.

The use of a trusted third party arbitrator, however, is limited because it is disadvantageous for the user to be required to rely on the trusted third party arbitrator to keep the user's identity a secret. For example, where the user requests access to anonymously fill out the on-line manager survey, it is disadvantageous for the user to be required to rely on a third party to maintain the anonymity of the user, particularly when that third party is likely under some control by the employer. In addition, even if a trusted third party arbitrator keeps the user's identity secret when the user authenticates into a role, the resource protector might still ascertain the user's identity from tracking the network location from which a user operates.

Therefore, in view of the foregoing, there is a need for a method, system, and program for allowing a user to anonymously authenticate into a role and anonymously connect to access resources in that role, without requiring the user to rely on a third party arbitrator to maintain anonymity. In particular, there is a need for a user to be in control of maintaining anonymity when evaluating into a role, while also enabling a resource protector to certify that the user is a member of the role.

SUMMARY OF THE INVENTION

Therefore, the invention provides authentication and provides identity protection during anonymous evaluation into a role. The invention provides a method, system, and program to allowing a user control over anonymity of the user's identity while evaluating into a role.

An anonymous authentication controller enables a user to control anonymity of the user's identity for role based network accesses to resources. First, a role authentication certificate is received from a role authenticator by a user, wherein the role authenticator issues the role authentication certificate to certify that the holder of the role authentication certificate is a member of a particular role without having the ability to track an identity of a user holding the role authentication certificate. Next, an anonymous channel is established for the user to anonymously present the role authentication certificate to a resource protector, wherein the resource protector requires the user to authenticate into the particular role to access a resource, wherein the role authentication certificate authenticates the user into the particular role without enabling the resource protector to ascertain the identity of the user, such that the user is in control of maintaining anonymity of the user identity for authenticated role-based accesses.

The user receives the role authentication certificate by requesting the role authentication certificate through a client system from the role authenticator and providing a credential that enables the role authenticator to determine whether the user is a member of the role. The user provides a credential in the form of an encrypted session key that can be decrypted to verify the user's identity. Then, the user's identity is matched in a database of members of the particular role. Alternatively, the user provides a credential by presenting a signed role authentication certificate that identifies the holder as a member of the particular role or of a role that includes the particular role. Next, the client system then engages in blind signature correspondence with the role authenticator and receives a blinded role authentication certificate signed by the role authenticator, wherein the blinded role authenticator certificate authenticates that the holder is a member of the particular role without revealing the identity of the user.

The anonymous channel established for presenting the role authentication certificate to the resource protector is also used for further communications with the resource protector. If the resource protector authorizes the user to access the resource, then all communications received in association with a session key presented with the role authentication certificate are allowed by the resource protector.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
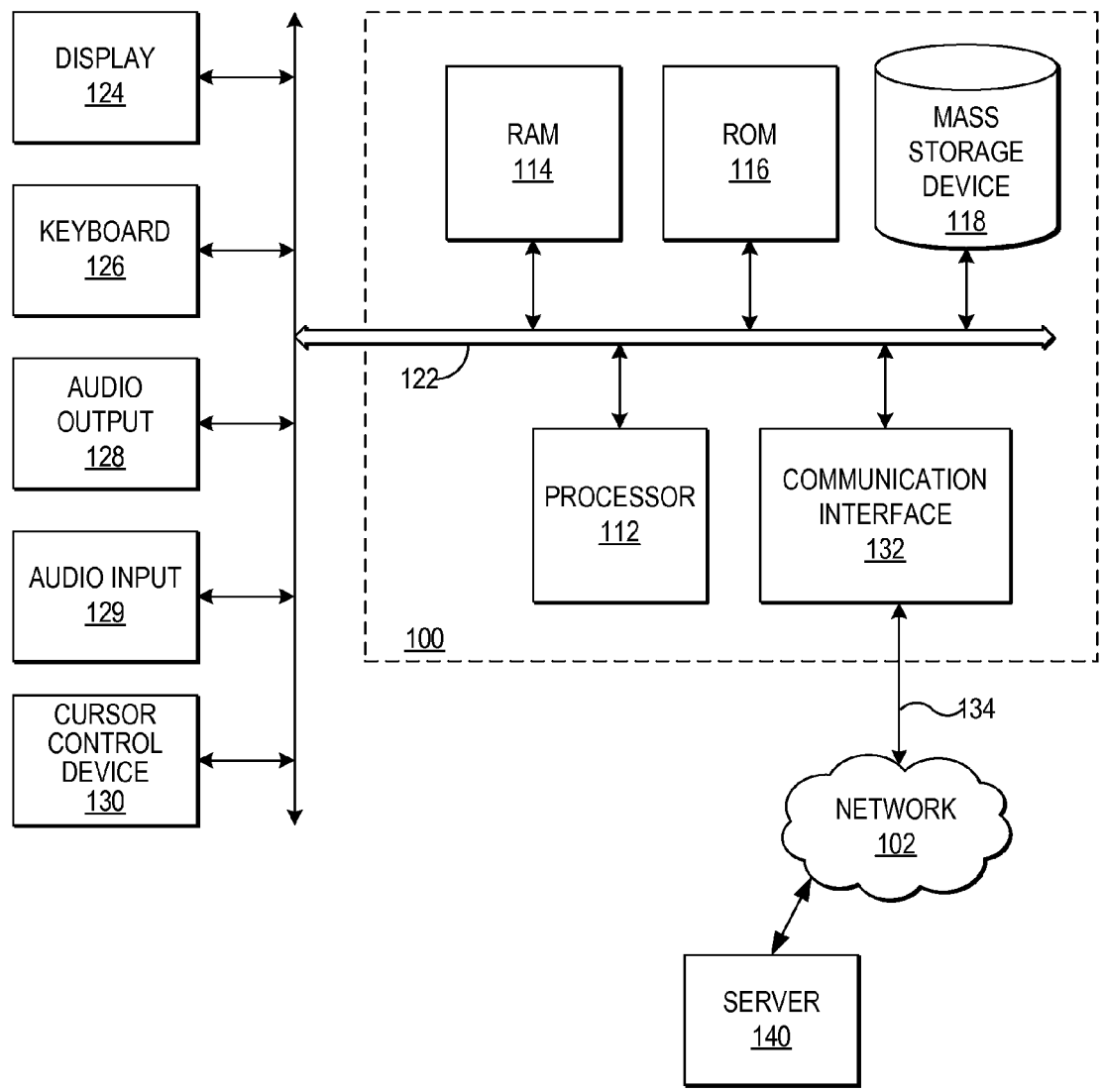
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application or operating system software contains machine executable instructions that when executed on processor 112 carry out the operations depicted in the flowchart of FIG. 5, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
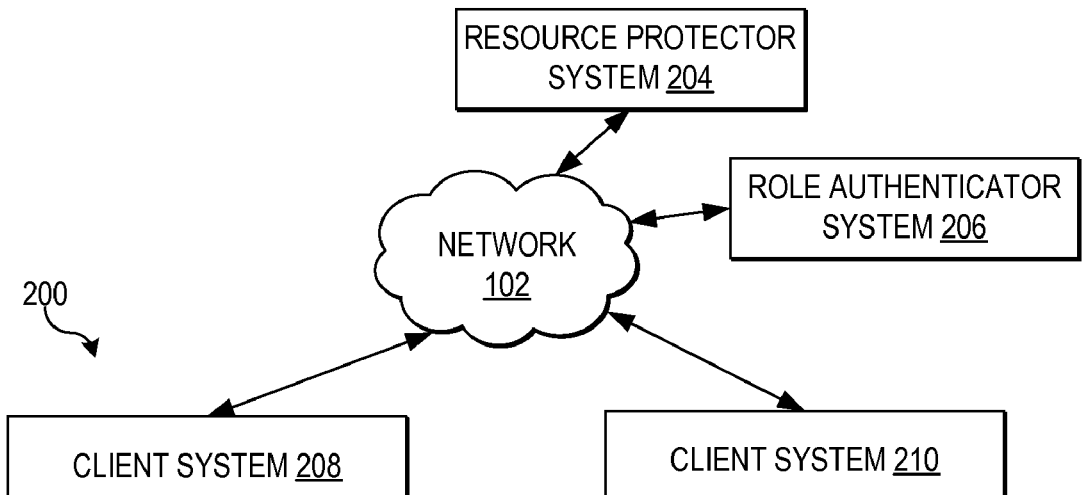
FIG. 2 depicts a distributed network system in which anonymous role authentication and connection may occur.

With reference now to FIG. 2, a block diagram depicts a distributed network system in which anonymous role authentication and connection may occur. Distributed data processing system 200 is a network of computers in which one embodiment of the invention may be implemented. It will be understood that the present invention may be implemented in other embodiments of systems enabled to communicate via a connection. In the embodiment, distributed data processing system 200 contains network 102, which is the medium used to provide communications links between various devices and computers connected together within distributed data processing system 200. Network 102 may include permanent connections such as wire or fiber optics cables, temporary connections made through telephone connections and wireless transmission connections.

The client/server environment of distributed system 200 includes multiple client systems 208 and 210 communicatively connected to network 102. In addition, there are multiple server systems, including resource protector system 204 and role authenticator system 206, communicatively connected to network 102.

The client/server environment of distributed system 200 is implemented within many network architectures. For example, the architecture of the World Wide Web (the Web) follows a traditional client/server model environment. The terms "client" and "server" are used to refer to a computer's general role as a requester of data (the client) or provider of data (the server). In the Web environment, web browsers such as Netscape Navigator™ typically reside on client systems 208 and 210 and render Web documents (pages) served by a web server, such as resource protector system 204 or role authenticator server 206. Additionally, each of client systems 208 and 210 and systems 204 and 206 may function as both a "client" and a "server" and may be implemented utilizing a computer system such as computer system 100 of FIG. 1. Further, the present invention is also implemented by client system 208 and 210 engaged in peer-to-peer network communications and downloading via network 102.

In one example, a user at client system 208 requests an anonymous role authentication certificate from role authenticator system 206. Role authenticator system 206 authenticates that the requesting user is a member of the role and returns an anonymous signed role authentication certificate proving the membership. Next, client system 208 establishes an anonymizing channel via network 102 to resource protector system 204 and requests access to resources accessible only by authentication into the role. Client system 208 passes the role authentication certificate and a session key to resource protector system 204. Resource protector system 204 verifies the signature on the role authentication certificate and communicates with role authenticator system 206 to verify the validity of the role authentication certificate if the certificate is constrained to a particular number of uses. If the signature is valid and the certificate is validated for the current use, then resource protector system 204 enables access to client system 208 to the resources protected by resource protector system 204 for communications encrypted with the session key. Although not depicted, it will be understood that the resource protector system may be the entry point to an additional network of resources. In addition, it is important to note that the role authentication certificate may be transportable such that the user can receive a role authentication certificate at client system 208 and transfer the role authentication certificate to client system 210 to present the role authentication certificate to resource protector system 204.

Figure 3:
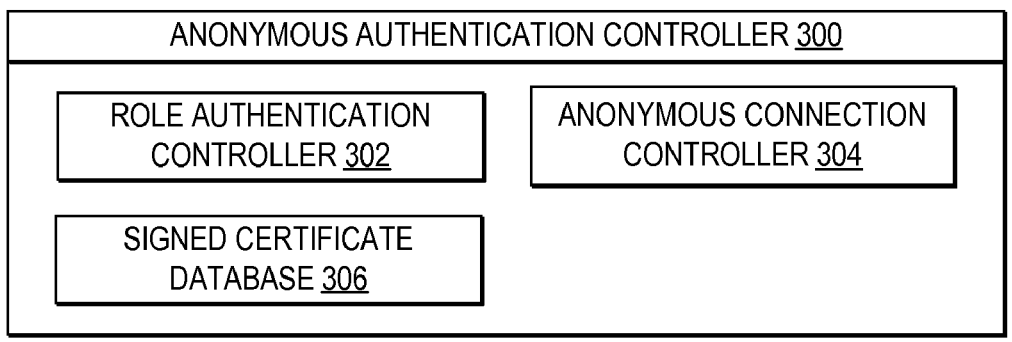
FIG. 3 depicts a block diagram of an anonymous authentication controller for enabling a user to control anonymity during role evaluation and connection in accordance with the method, system, and program of the present invention.

Referring now to FIG. 3, there is depicted a block diagram of an anonymous authentication controller for enabling a user to control anonymity during role evaluation and connection in accordance with the method, system, and program of the present invention. As depicted, an anonymous authentication controller 300 includes a role authentication controller 302 for negotiating signed role authentication certificates from a role authenticator by presenting a credential that enables the role authenticator to determine whether the presenter is a member of the role, creating a group of blinded role authentication certificates for blind signature by the role authenticator, receiving a signed blinded role authentication certificate, ensuring that the signature cannot contain a subliminal channel, and controlling unblinding and storage of the signed blinded role authentication certificate received from a role authenticator. In particular, role authentication controller 302 controls storage of unblinded role authentication certificates in signed certificate database 306. The role authentication certificate identifies that the bearer is a member of a particular role, but does not identify the bearer. Since the role authenticator signs a blinded role authentication certificate, the role authenticator cannot identify the holder of the role authentication certificate except for specific circumstances allowed by the holder. It is also important to note that the holder of a signed role authentication certificate is not required to reveal an identity when presenting the signed role authentication certificate for role-based accesses.

In addition, as depicted, anonymous authentication controller 300 includes an anonymous connection controller 304. Anonymous connection controller 304 controls the user connection to a resource protector. First, anonymous connection controller 304 establishes an anonymizing channel for communicating with a resource protector. Next, anonymous connection controller 304 adds a session key to the signed role authentication certificate and requests authentication into a role with the signed role authentication certificate. The session key may implement, for example, a shared key, a public/private key, or other key that identifies the session. Once the resource protector verifies the signature on the role authentication certificate and authenticates the user into the role, anonymous connection controller uses the session key to identify communications and resource accesses by the user without identifying the user.

Figure 4:
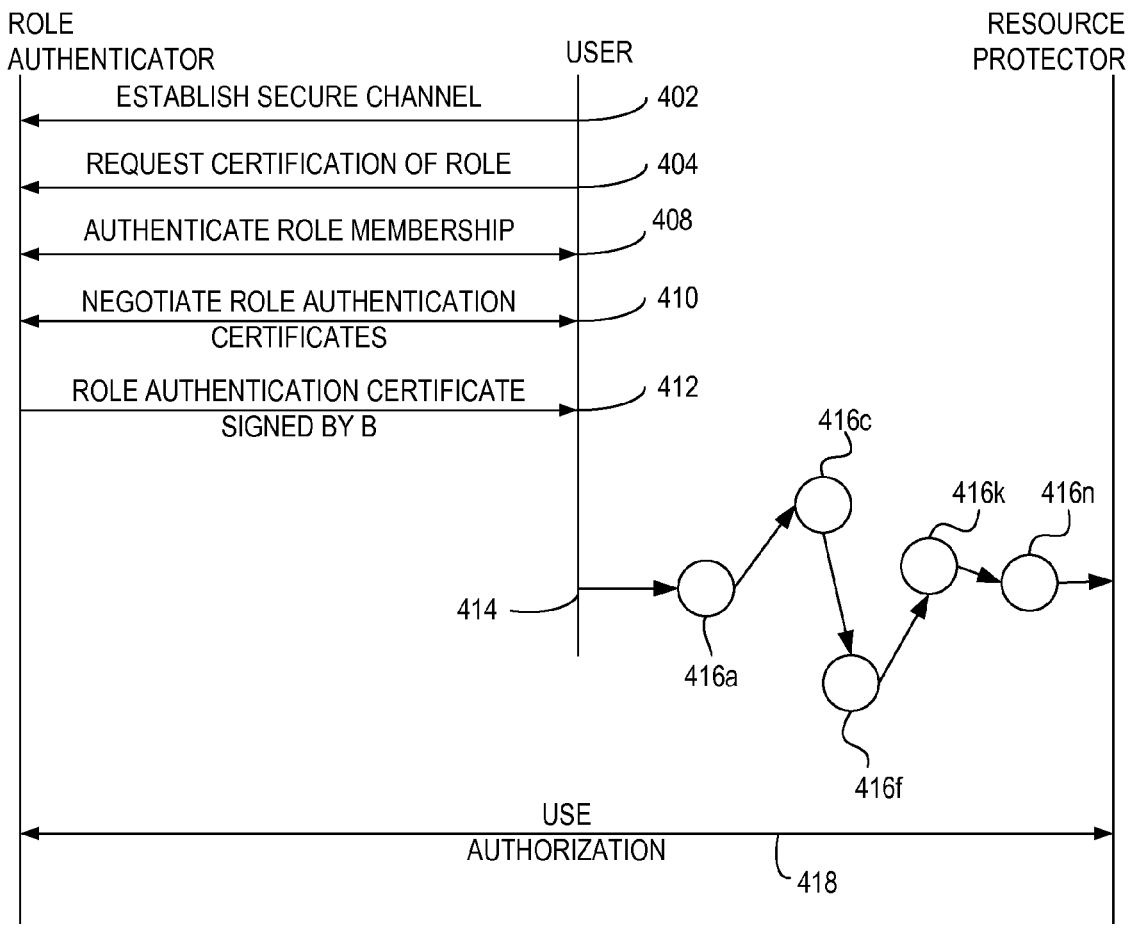
FIG. 4 depicts a flow diagram of user controlled anonymity in role authentication and role-based access in accordance with the present invention.

With reference now to FIG. 4, there is depicted a flow diagram of user controlled anonymity in role authentication and role-based access in accordance with the present invention. In a first series of transactions, a user requests and receives a role authentication certificate from a role authenticator where the role authentication certificate certifies that the user is a member of the role but does not reveal the user's identity. In particular, as depicted at reference numeral 402, preferably, a user establishes a secure channel for communication with the role authenticator. The secure channel may be implemented through the Secure Sockets Layer (SSL) or other secure channel protocol. Next, as depicted at reference numeral 404, a user sends a request for certification of membership in a role to the role authenticator. The request for certification may be notated, for example, as "Req($C_R$)" where "Req" is the request, "C" indicates a certificate and "R" indicates the role for which a certificate is requested.

Next, as depicted at reference numeral 408, the role authenticator and the user authenticate one another's identity and the role authenticator determines whether the user presents a credential that allows the role authenticator to determine that the user is a member of a role. In one example, the role authenticator and the user may authenticate one another's identities using public key authentication. In particular, a user may have generated a public/private key pair that identifies the user, such that the user encrypts a session key with the user's private key and the role authenticator decrypts the session key with the user's public key to authenticate the user's identity. The role authenticator then looks in a database of role members to determine if the user's identity is included in the database. In another example, a user may prove membership to a role and keep the user's identity anonymous, even to the role authenticator, by providing a signed role authentication certificate issued by that role authenticator or another role authenticator. In particular, it is common for membership in a role, such as manager, to mean that the user is also a member of lower level roles under the manager role, such that upon presentation of a role authentication certificate for the role of manager, a role authenticator can authenticate that user for lower level roles, without requiring the user identification.

As depicted at reference numeral 410, the user and the role authenticator communicate to negotiate transfer of signed blinded role authentication certificates. In the example, the communication involves using a Chaum blind signature scheme. In particular, a zero-knowledge protocol employing a cut and choose technique is preferably employed. First, the user presents a set of blinded certificates to the role authenticator to sign. Then, using the cut and choose technique, the role authenticator randomly chooses a subset of the certificates and requests the blinding factors for that subset from the user. The user sends the requested blinding factors for the subset of certificates to the role authenticator. The role authenticator unblinds the subset of certificates and verifies the integrity of the contents identifying the role. More specifically, the role authenticator determines whether all the unblinded certificates specify that the user is a member of the role. If any one of the unblinded certificates does not specify the same role membership as any of the other unblinded certificates, then the user is attempting a fraud.

Next, as depicted at reference numeral 412, the role authenticator signs the blinded remainder of the certificates, each of which is assumed to identify the same role membership as is specified in the unblinded certificates, and returns the signed blinded certificates to the user. In particular, the role authenticator creates a digital signature on the remaining subset of blinded certificates sent by the user and sends the signed subset back to the user. The user should then verify that the role authenticator's signature cannot contain a subliminal channel that allows the role authenticator to include the user's identity into the role authenticator's signature. Once the user verifies that the role authenticator's signature cannot contain a subliminal channel, then the user unblinds the certificates while preserving the role authenticator's signature. As a result of the exchange, the user holds a role authentication certificate signed by the role authenticator containing a unique identifier and the role identifier, but not identifying the user in any way. The signed role authentication certificate may be notated, for example, as $S_B(C_{->R})$ where "$S_B$" is the role authenticator's digital signature and the "->R" indicates that the holder of the certificate has authenticated into the role.

Next, in a second series of transactions, a user attempts to gain access to a resource protected by the resource protector which requires authentication into a particular role by submitting the role authentication certificate for that role through an anonymous communication channel. In particular, as depicted at reference numeral 414, the user contacts the resource protector through an anonymizing channel and presents the role authentication certificate and a session key. In one example, an Onion Routing channel may be implemented as an anonymizing channel. An Onion Routing channel typically includes a chain of multiple nodes 416a-416n that pass encrypted packets from one to another. The encrypted packets are enveloped such that each node in the chain only knows the immediately preceding and immediately following node in the encrypted packet's path. Sufficient nodes are included in the chain so that the address of the originating node is protected, protecting the resource protector from determining the identity of the user from the network location at which the user is located.

Once the resource protector receives the role authentication certificate and session key, the resource protector verifies the signature on the certificate is that of the role authenticator. In particular, the resource protector may verify the signature on the certificate is that of the role authenticator by decrypting the digital signature using the role authenticator's public key. Advantageously, the resource protector is assured that the user presenting the role authentication certificate is a member of the certified role, but the user has remained in control of protecting the user's anonymity, without having to rely on any single third party to maintain the user's anonymity.

In addition, as depicted at reference numeral 418, the resource protector may request use authorization from the role authenticator or other trusted system that can track the number of times a role authentication certificate is presented. In particular, a role authentication certificate may include an identifier, such as a nonce, that is unblinded by the user after the role authentication certificate is signed. If a role authentication certificate is limited to a particular number of uses, the resource protector may present the role authentication certificate to the role authenticator or other trusted system to determine whether the role authentication certificate has been presented more times that allowed.

In one example, the user is a voter, the role authenticator is a government, and the resource protector is a voting authority. In this example, the voting authority is only allowed to let the voter vote once, but the voter wants to remain anonymous when voting. Thus, in the example, when the role authenticator issues a signed, blinded role authentication certificate, the certificate includes the digital signature of the role authenticator and a blinded identifier used as a nonce. When the resource protector receives the role authentication certificate for one time use, the resource protector verifies the signature of the role authenticator using the role authenticator's public key. In addition, the resource protector may contact the role authenticator to verify that the role authentication certificate is valid for the one time use. The role authenticator determines whether the role authentication certificate has already been used. If the role authenticator detects that the role authentication certificate has already been presented, the role authenticator preferably alerts the resource protector to deny voting privileges to the holder. In addition, the role authenticator may determine the identity of the holder of the role authentication certificate using key splitting and oblivious transfer or another technique that allows the role authenticator to determine the identity of the holder when the holder uses the role authentication certificate more than once. It is important to note that in addition to the role authenticator, other systems that are trusted by the resource protector to keep a record may track the number of times any particular role authentication certificate is used.

In another example, the user is a survey participant, the role authenticator is a business, and the resource protector is the survey administrator for the business. In the example, the survey participant is enabled to remain anonymous by acquiring a role authentication certificate as a survey participant from the role authenticator. However, the role authenticator and the resource protector are controlled by one entity; the resource protector can access the role authenticator's records of who has logged in to receive role authentication certificates. When the role authenticator and the resource protector are controlled by the same entity, it is advantageous to include an additional time delay between the time that the user receives the role authentication certificate and the time that the user attempts to evaluate into a role with the resource protector with the role authentication certificate.

It is important to note that applications of the present invention are broad and may be adapted to meet the requirements for role authentication and to meet the required level of anonymity desired by the user. For example, a user may receive an anonymous role authentication certificate that can be presented through an anonymizing channel for access to an anonymous chat room without having to rely on a third party role authentication certificate issuer to maintain the anonymity of the user. In another example, a health insurance subscriber may receive an anonymous role authentication certificate that can be presented to reveal that the holder is insured, but not reveal the holder's health conditions. In yet another example, a student may receive an anonymous role authentication certificate that can be presented any time the student needs to prove membership as a student without revealing the student's identity, such as when the student needs to fill out a professor evaluation on-line.

Figure 5:
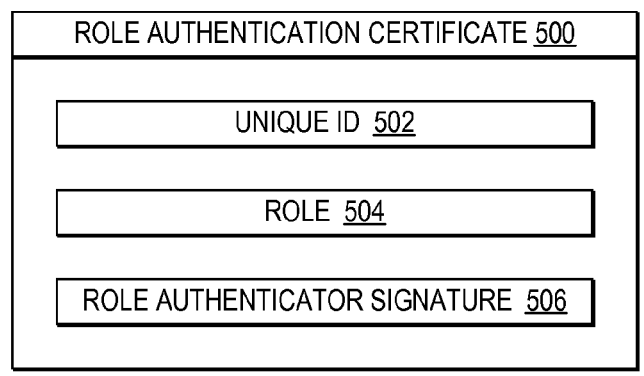
FIG. 5 depicts a block diagram of the components included in a role authentication certificate in accordance with the method, system, and program of the present invention.

Referring now to FIG. 5, there is a block diagram of the components included in a role authentication certificate in accordance with the method, system, and program of the present invention. As depicted, role authentication certificate 500 includes a unique identifier (ID) 502, a role 504, and a role authenticator signature 506. Unique identifier 502 is placed in role authentication certificate 500 by the user as a nonce to allow tracking of the number of times role authentication certificate 500 is presented, however, unique identifier 502 does not reveal an identity of the user. In particular, unique identifier 502 is within the blinded certificate signed by the role authenticator, such that the role authenticator does not know the value of unique identifier 502 when role authenticator signs role authentication certificate 500. Role authenticator signature 506 identifies the role authenticator in such a way that the role authenticator's signature can be verified, but cannot identify the user who received role authentication certificate. For example, the role authenticator may add a digital signature that can be verified with the role authenticator's public key. Role 504 identifies the role or roles for which the holder of the certificate is a member.

Figure 6:
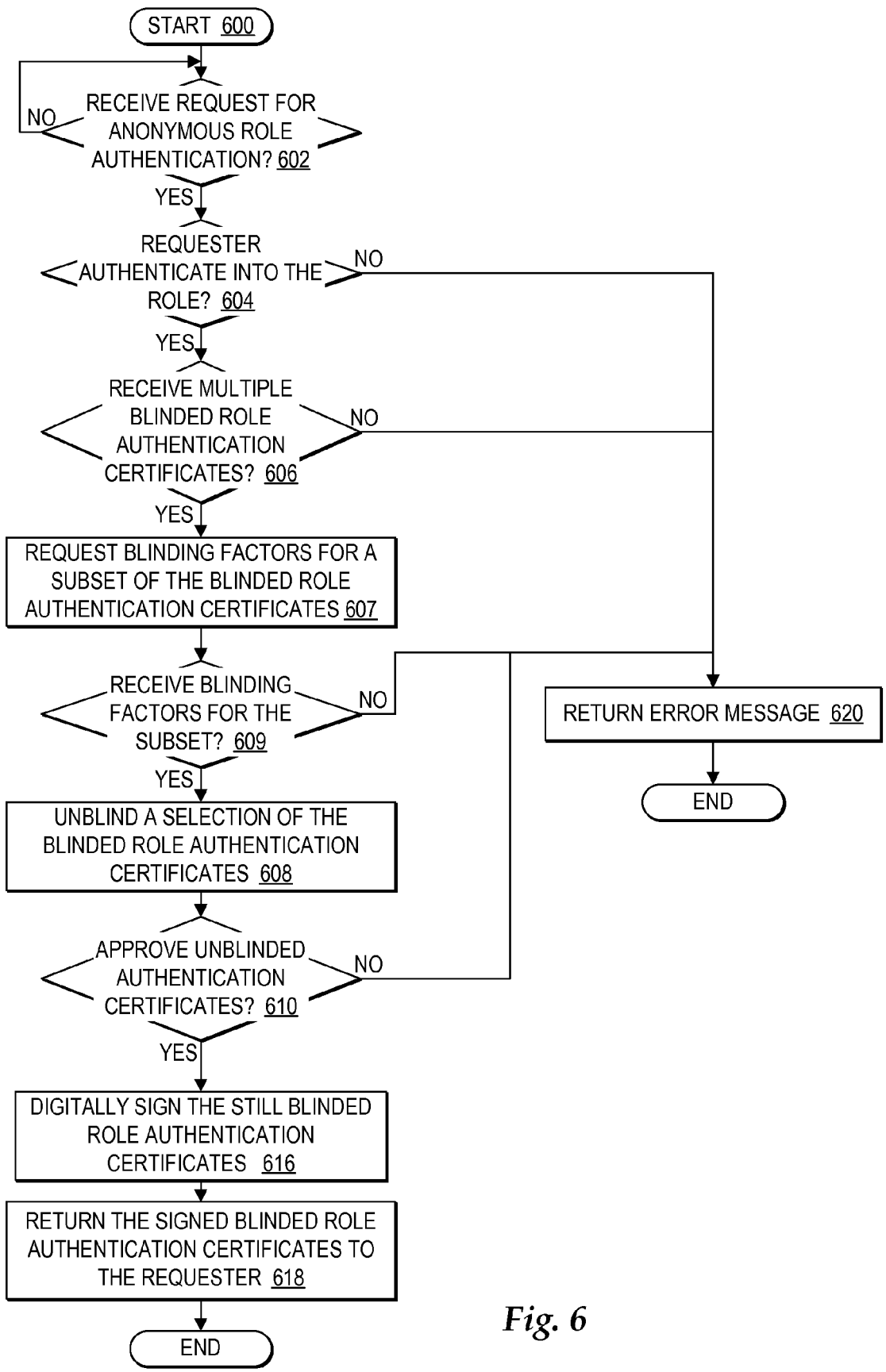
FIG. 6 depicts a high level logic flowchart of a process and program for controlling issuance of anonymous role authentication certificates in accordance with the method, system, and program of the present invention.

With reference now to FIG. 6, there is depicted a high level logic flowchart of a process and program for controlling issuance of anonymous role authentication certificates in accordance with the method, system, and program of the present invention. As depicted, the process starts at block 600 and thereafter proceeds to block 602. Block 602 depicts a determination whether a request for anonymous role authentication is received. When a request for anonymous role authentication is received, the process passes to block 604. Block 604 depicts a determination whether a requester authenticates into the requested role. If the requester does not authenticate into the requested role, then the process passes to block 620. Block 620 depicts returning an error message and the process ends. If the requester does authenticate into the requested role, then the process passes to block 606.

Block 606 depicts a determination whether multiple blinded role authentication certificates are received. If multiple blinded role authentication certificates are not received, then the process passes to block 620. Otherwise, when multiple blinded role authentication certificates are received, the process passes to block 607. Block 607 depicts requesting blinding factors for the subset of the blinded role authentication certificates. Next, block 609 depicts a determination whether blinding factors are received for the subset. If blinding factors are not received, then the process passes to block 620. If blinding factors are received, then the process passes to block 608. Block 608 depicts unblinding a selection of the blinded role authentication certificates.

Next, block 610 depicts a determination whether the unblinded role authentication certificates are approved. If approved, the role authenticator will place a signature as a stamp of approval, so the role authenticator must determine whether the unblinded role authentication certificates are accurate. If the unblinded authentication certificates are not approved, then the process passes to block 620. If the unblinded authentication certificates are approved, then the process passes to block 616. Block 616 depicts digitally signing the still blinded role authentication certificates. Thereafter, block 618 depicts returning the signed blinded role authentication certificates to the requester, and the process ends.

Figure 7:
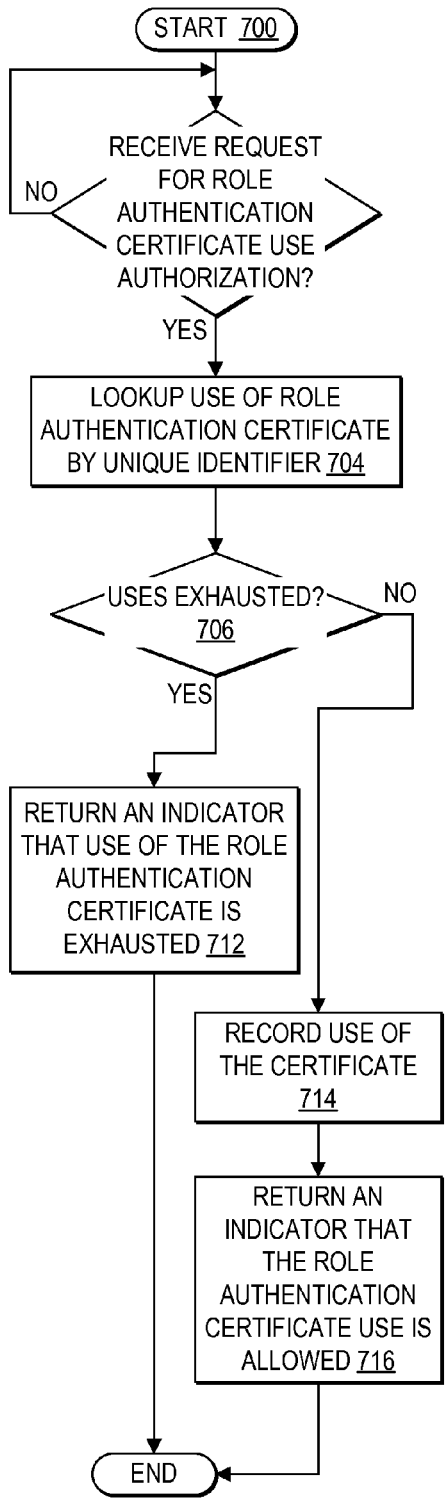
FIG. 7 depicts a high level logic flowchart of a process and program for controlling use of a role authentication certificate in accordance with the method, system, and program of the present invention.

Referring now to FIG. 7, there is depicted a high level logic flowchart of a process and program for controlling use of a role authentication certificate in accordance with the method, system, and program of the present invention. As depicted, the process starts at block 700 and thereafter proceeds to block 702. Block 702 depicts a determination whether a request for role authentication certificate use authorization is received. Once a request for role authentication certificate use authorization is received, the process passes to block 704. Block 704 depicts looking up the use of the role authentication certificate by the unique identifier included in the role authentication certificate. Next, block 706 depicts a determination the uses of the role authentication certificate are exhausted. In particular, the role authenticator or resource protector may specify the number of times that a user can authenticate into a particular role. If uses are exhausted, then the process passes to block 712. Block 712 depicts returning an indicator that the use of the role authentication certificate is exhausted, and the process ends. Otherwise, at block 706, if uses are not exhausted, then the process passes to block 714. Block 714 depicts recording the use of the certificate in a database. Next, block 716 depicts returning an indicator to the resource protector that the role authentication certificate use is allowed, and the process ends.

Figure 8:
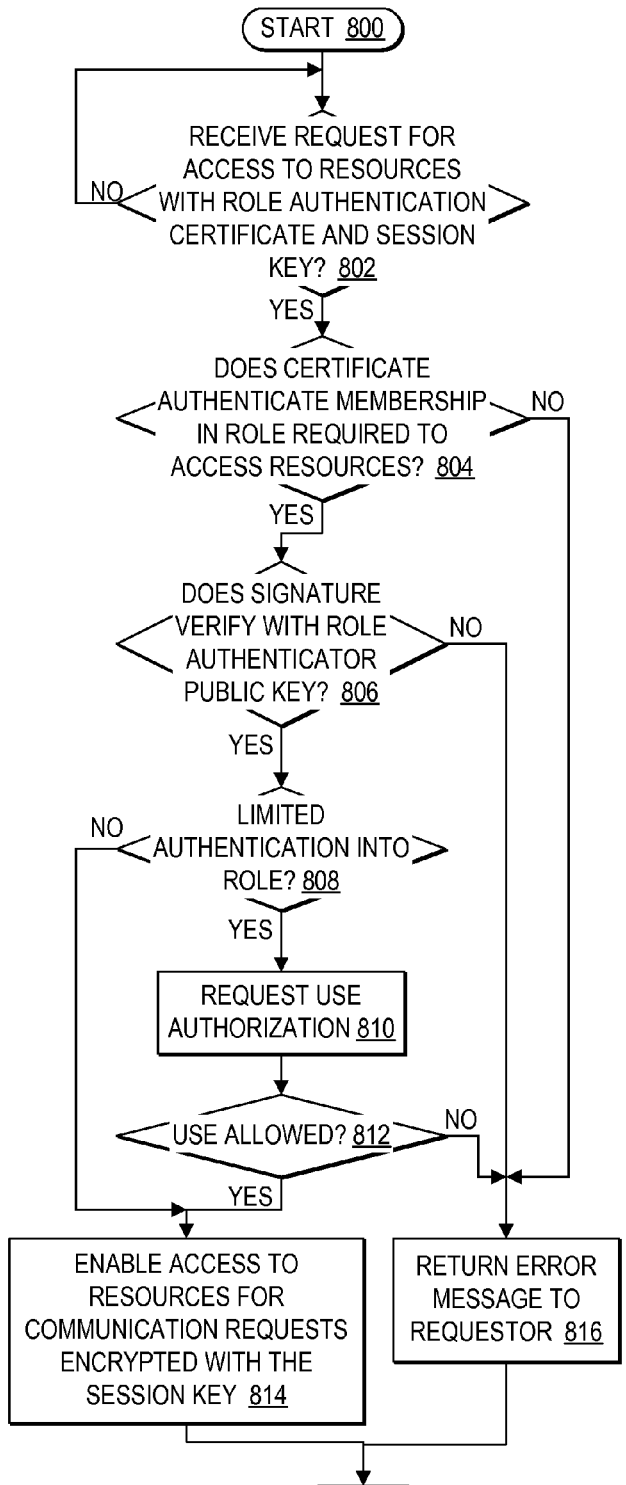
FIG. 8 depicts a high level logic flowchart of a process and program for controlling role authentication for access to protected resources with a role authentication certificate received from a requestor.

With reference now to FIG. 8, there is depicted a high level logic flowchart of a process and program for controlling role authentication for access to protected resources with a role authentication certificate received from a requestor. As depicted, the process starts at block 800 and thereafter proceeds to block 802. Block 802 depicts a determination whether a request to access resources and a role authentication certificate and session key are received. Once a request to access resources is received, the process passes to block 804. Block 804 depicts a determination whether the role authentication certificate indicates membership in a role required to access the resources. If the role authentication certificate does not indicate required role membership, then the process passes to block 816. Block 816 depicts returning an error message to the requester, and the process ends. Otherwise, at block 804, if the role authentication certificate does indicate required role membership then the process passes to block 806.

Block 806 depicts a determination whether the signature on the role authentication certificate is verified with the role authenticator's public key. If the signature is not verified, then the process passes to block 816. If the signature is verified, then the process passes to block 808.

Block 808 depicts a determination whether there is a limited authentication into the role. In particular, there is a determination whether there is a limit on the number of times that a user can authenticate into a role with a particular role authentication certificate. If there is not a limitation, then the process passes to block 814. Block 814 depicts enabling access to the resources for communication requests encrypted with the session key, and the process ends. Otherwise, at block 808, if there is a limitation, then the process passes to block 810. Block 810 depicts requesting a use authorization. The resource protector may request a use authorization from a role authenticator or other trusted source that records the use of role authentication certificates. Next, block 812 depicts a determination whether the use is allowed. If the use is not allowed, then the process passes to block 816. If the use is allowed, then the process passes to block 814.

Figure 9:
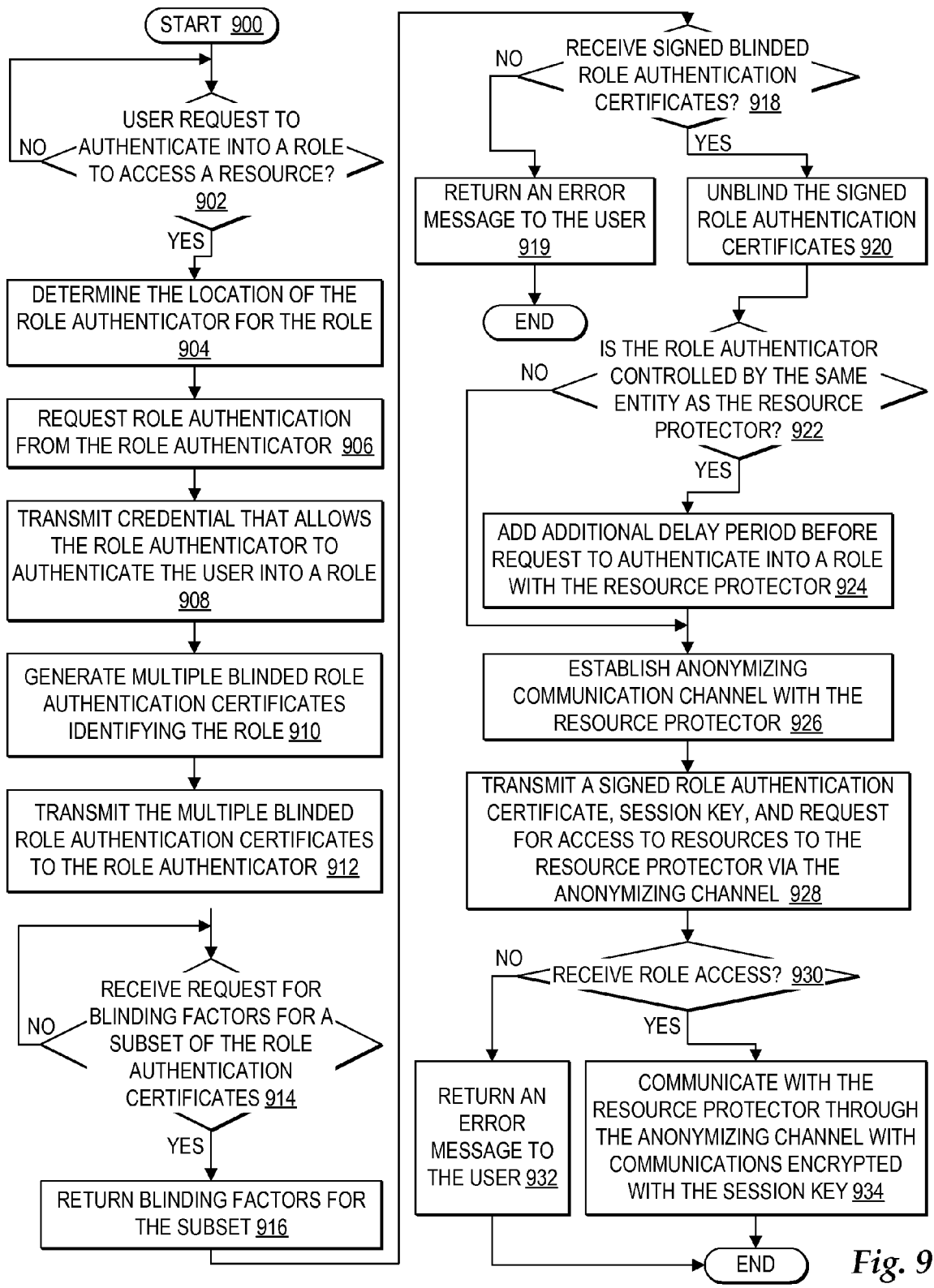
FIG. 9 depicts a high level logic flowchart of a process and program for enabling a user to authenticate into a role while controlling anonymity in accordance with the method, system, and program of the present invention.

Referring now to FIG. 9, there is depicted a high level logic flowchart of a process and program for enabling a user to authenticate into a role while controlling anonymity in accordance with the method, system, and program of the present invention. As depicted, the process starts at block 900 and thereafter proceeds to block 902. Block 902 depicts a determination whether a user requests to authenticate into a role to access a resource. Once a user requests to authenticate into a role to access a resource, then the process passes to block 904. Block 904 depicts determining the location of the role authenticator for the role. For example, the user may access a directory of role authenticators to determine the location of the role authenticator for the role. Next, block 906 depicts sending a request for a role authentication certification to the selected role authenticator. Thereafter, block 908 depicts transmitting a credential that enables the role authenticator to authenticate the user into a role. Next, block 910 depicts generating multiple blinded role authentication certificates identifying the role. Thereafter, block 912 depicts transmitting the multiple blinded authentication certificates to the role authenticator, and the process passes to block 914.

Block 914 depicts a determination whether a request for blinding factors for a subset of the role authentication certificates is received. Once the request for blinding factors for a subset of the role authentication certificates is received, then the process passes to block 916. Block 916 depicts returning blinding factors for the subset to the role authenticator.

Next, block 918 depicts a determination whether signed blinded role authentication certificates are received. If no signed blinded authentication certificates are received, then the process passes to block 919. Block 919 depicts returning an error message to the user, and the process ends. If signed blinded authentication certificates are received, then the process passes to block 920. Block 920 depicts unblinding the signed role authentication certificates, and the process passes to block 922.

Block 922 depicts a determination whether the role authenticator is controlled by the same entity as the resource protector. If the role authenticator is controlled by the same entity as the resource protector, then the process passes to block 924. Block 924 depicts adding an additional delay period before the request to authenticate into a role is sent to the resource protector, and the process passes to block 926. In particular, an additional delay based on the usage of the resource and potentially a random variable may be added to reduce the possibility that the user's identity can be determined because the user is the only member of the role that has requested a role authentication certificate. If the role authenticator is not controlled by the same entity as the resource protector, then the process passes to block 926. It is important to note that even if the role authenticator is not controlled by the same entity as the resource protector, some delay will be added before the resource protector is contacted. Block 926 depicts establishing an anonymizing communication channel with the resource protector. Next, block 928 depicts transmitting a signed role authenticate certificate, session key, and request for access to resources to the resource protector via the anonymizing channel. Thereafter, block 930 depicts a determination whether role access is received. If role access is not received, then the process passes to block 932. Block 932 depicts returning an error message to the user, and the process ends. If role access is received, then the process passes to block 934. Block 934 depicts communicating with the resource protector through the anonymizing channel with communications encrypted by the session key, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for anonymous role authentication, comprising:

an anonymous authentication controller comprising at least one processor connected to a memory and communicatively connected to a role authenticator via a network;

said anonymous authentication controller for requesting a role authentication certificate from said role authenticator;

said anonymous authentication controller for providing a credential that enables said role authenticator to determine that said particular user is a member of a particular role and a plurality of blinded role authentication certificates identifying said particular role;

said role authenticator, responsive to receiving said credential that specifies said particular user is a member of said particular role and receiving said plurality of blinded role authentication certificates, for requesting blinding factors for a only a random selection of said plurality of blinded role authentication certificates;

said anonymous authentication controller, responsive to receiving said request for said blinding factors for only said random selection of said plurality of blinded role authentication certificates, for returning said selection of blinding factors for only said random selection of said plurality of blinded role authentication certificates;

said role authenticator, responsive to receiving said returned selection of blinding factors, for unblinding said random selection of said plurality of blinded role authentication certificates and comparing roles specified in said unblinded selection of said plurality of blinded role authenticated certificates with said particular role;

said role authenticator, responsive to detecting said roles specified in said unblinded selection of said plurality of blinded role authenticated certificates match said particular role, for applying a digital signature to a remaining blinded selection of said plurality of blinded role authentication certificates and returning said signed remaining blinded selection of said plurality of blinded role authentication certificates to said anonymous authentication controller, wherein said signed remaining blinded selection of said plurality of blinded role authentication certificates authenticate that a holder of said role authentication certificate is a member of a particular role without allowing said role authenticator issuing said role authentication certificate to track an identity of a particular user holding said role authentication certificate;

said anonymous authentication controller, responsive to verifying that said digital signature of said role authenticator on said signed remaining blinded selection of said plurality of blinded role authentication certificates does not contain a subliminal channel that allows said role authenticator to include an identity of said particular user, for unblinding said signed remaining blinded selection of said plurality of blinded role authentication certificates while preserving said digital signature of said role authenticator;

said anonymous authentication controller for establishing an anonymous channel for anonymously presenting one of unblended signed role certificates as said role authentication certificate to a resource protector via said network, wherein said resource protector requires said particular user to authenticate into said particular role to access a resource, wherein said role authentication certificate authenticates said particular user into said particular role without enabling said resource protector to ascertain said identity of said particular user.

2. The system for anonymous role authentication according to claim 1, further comprising said role authenticator for providing an encrypted sessions key that when verified with a public key of said particular user authenticates an identity of said particular user, wherein said role authenticator matches said identity within a plurality of identities of members of said particular role to authenticate said user into said particular role.

3. The system for anonymous role authentication according to claim 1, further comprising said role authenticator for providing a signed role authentication certificate authenticating said holder of said certificate as authenticated to a second role, wherein by authenticating to said second role said holder of said certificate proves membership to said particular role.

4. The system for anonymous role authentication according to claim 1, wherein said role authenticator and said resource protector are controlled by a single entity.

5. The system for anonymous role authentication according to claim 1, further comprising said anonymous authentication controller for establishing said anonymous communication channel comprising a plurality of nodes wherein each of said plurality of nodes only knows of a previous node and a following node.

6. The system for anonymous role authentication according to claim 1, further comprising said anonymous authentication controller for maintaining said anonymous channel for communicating with said resource protector after authenticating into said particular role.

7. The system for anonymous role authentication according to claim 1, further comprising said anonymous authentication controller for presenting said role authentication certificate and a session key to said resource protector, wherein upon authentication into said particular role, said resource protector enables access to said resource for requests associated with said session key.

8. The system for anonymous role authentication according to claim 1, wherein said role authentication certificate is valid for a particular number of presentations.

9. A non-transitory machine-readable medium storing machine executable instructions for anonymous role authentication, wherein the machine executable instructions when executed on a computer causes the computer to:

request, by an anonymous authentication controller, a role authentication certificate from a role authenticator;

provide, by said anonymous authentication controller, a credential that enables said role authenticator to determine that said particular user is a member of a particular role and a plurality of blinded role authentication certificates identifying said particular role;

responsive to said role authenticator receiving said credential that specifies said particular user is a member of said particular role and receiving said plurality of blinded role authentication certificates, request, by said role authenticator, blinding factors for a only a random selection of said plurality of blinded role authentication certificates;

responsive to said anonymous authentication controller receiving said request for said blinding factors for only said random selection of said plurality of blinded role authentication certificates, return, by said anonymous authentication controller, said selection of blinding factors for only said random selection of said plurality of blinded role authentication certificates;

responsive to said role authenticator receiving said returned selection of blinding factors, unblind, by said role authenticator, said random selection of said plurality of blinded role authentication certificates and comparing roles specified in said unblinded selection of said plurality of blinded role authenticated certificates with said particular role;

responsive to said role authenticator detecting said roles specified in said unblinded selection of said plurality of blinded role authenticated certificates match said particular role, apply a digital signature, by said role authenticator, to a remaining blinded selection of said plurality of blinded role authentication certificates and returning said signed remaining blinded selection of said plurality of blinded role authentication certificates to said anonymous authentication controller, wherein said signed remaining blinded selection of said plurality of blinded role authentication certificates authenticate that a holder of said role authentication certificate is a member of a particular role without allowing said role authenticator issuing said role authentication certificate to track an identity of a particular user holding said role authentication certificate;

responsive to verifying, by said anonymous authentication controller, that said digital signature of said role authenticator on said signed remaining blinded selection of said plurality of blinded role authentication certificates does not contain a subliminal channel that allows said role authenticator to include an identity of said particular user, unblind, by said anonymous authentication controller, said signed remaining blinded selection of said plurality of blinded role authentication certificates while preserving said digital signature of said role authenticator;

establish, by said anonymous authentication controller, an anonymous channel for anonymously presenting one of unblended signed role certificates as said role authentication certificate to a resource protector, wherein said resource protector requires said particular user to authenticate into said particular role to access a resource, wherein said role authentication certificate authenticates said particular user into said particular role without enabling said resource protector to ascertain said identity of said particular user, such that said particular user is in control of any disclosure of said identity for authenticated role-based accesses.

10. The non-transitory machine readable medium according to claim 9, wherein the machine executable instructions when executed on a computer further causes the computer to:

provide an encrypted sessions key that when verified with a public key of said particular user authenticates an identity of said particular user, wherein said role authenticator matches said identity within a plurality of identities of members of said particular role to authenticate said user into said particular role.

11. The non-transitory machine readable medium according to claim 9, wherein the machine executable instructions when executed on a computer further causes the computer to:
provide a signed role authentication certificate authenticating said holder of said certificate as authenticated to a second role, wherein by authenticating to said second role said holder of said certificate proves membership to said particular role.

12. The non-transitory machine readable medium according to claim 9, wherein the machine executable instructions when executed on a computer further causes the computer to:
delay establishing said anonymous channel after receiving said role authentication certificate.

13. The non-transitory machine readable medium according to claim 9, wherein the machine executable instructions when executed on a computer further causes the computer to: establish said anonymous communication channel comprising a plurality of nodes wherein each of said plurality of nodes only knows of a previous node and a following node.

14. The non-transitory machine readable medium according to claim 9, wherein the machine executable instructions when executed on a computer further causes the computer to:
maintain said anonymous channel for communicating with said resource protector after authenticating into said particular role.

15. The non-transitory machine readable medium according to claim 9, wherein the machine executable instructions when executed on a computer further causes the computer to:
present said role authentication certificate and a session key to said resource protector, wherein upon authentication into said particular role, said resource protector enables access to said resource for requests associated with said session key.

* * * * *